Nov. 20, 1928.
A. F. ORTIZ
1,692,760
MILK COOLING AND FILTERING APPARATUS
Filed Jan. 7, 1927
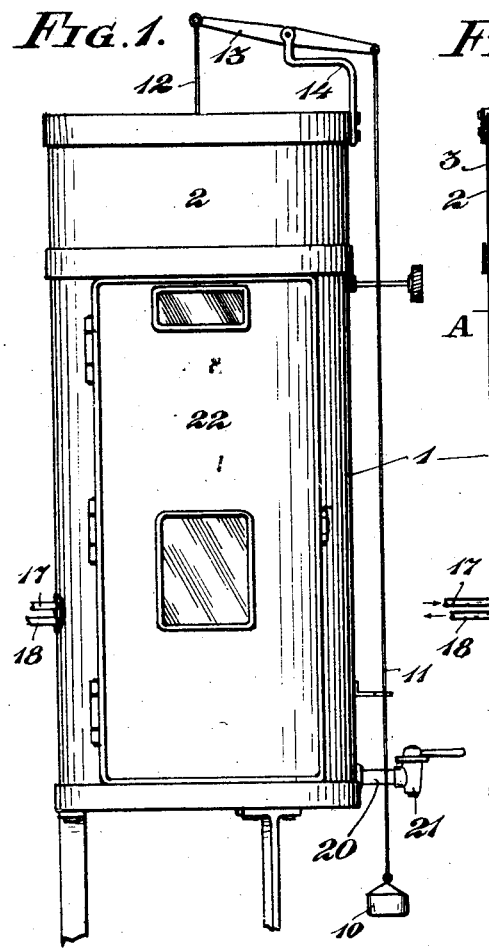
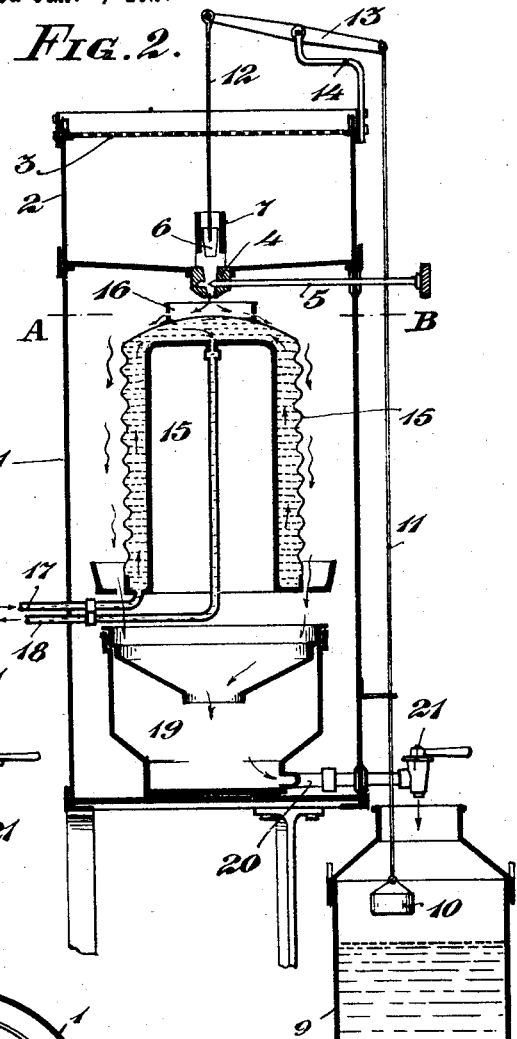
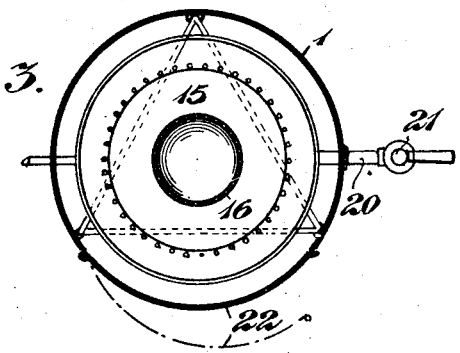
Angel Francisco Ortiz
INVENTOR
BY
his ATTORNEY.

Patented Nov. 20, 1928.

1,692,760

UNITED STATES PATENT OFFICE.

ANGEL FRANCISCO ORTIZ, OF BUENOS AIRES, ARGENTINA.

MILK COOLING AND FILTERING APPARATUS.

Application filed January 7, 1927. Serial No. 159,513.

This invention relates to an apparatus for preparing milk and has reference particularly to a cooling and filtering arrangement.

The invention has for its object to provide a device of this character which is efficient in operation and easily cleaned after use. I accomplish this object by means of an apparatus described and claimed in the following specification, and illustratively exemplified in the accompanying drawings, in which Figure 1 is a front elevational view of my improved milk cooler and filter; Figure 2 is a substantially longitudinal sectional view of the machine; and Figure 3 is a substantially transverse sectional view taken on line A—B of Figure 2.

Referring to the drawings, 1 denotes the body of a cylindrical tank which is closed at its bottom end and open at the upper end, the latter end being provided with a flange or seat upon which rests a receiving receptacle 2. The receptacle at its upper or open end is provided with a strainer 3 in the shape of a disc which is supported on a flanged arrangement about the periphery of the receptacle 2. Located in the center of the bottom of the receptacle 2 is a valve 4, having a control member 5 and an automatically operated plunger 6 movable in a second valve 7 to open and close two ports leading to the first valve 4. The plunger 6 is operated from the milk in a milk can 9 disposed at the side of the apparatus and in which a float 10 is arranged. The float 10 is suspended from the lower end of a rod 11 which in turn depends from an arm of a lever 13 pivotally supported on a bracket 14 at the top of the receptacle 2. The other arm of the lever 13 carries the plunger 6 by means of a rod 12 projecting through the screen 3 and into the valve 7.

A refrigerating unit is disposed within the tank 1 below the receptacle and comprises corrugated body or inverted receptacle 15. Within the body 15 is an inverted cup shaped wall which is spaced from the body 15 to provide a space to receive the refrigerant which circulates from an inlet pipe 17 through the unit and discharges through an outlet pipe 18 from a point at the crown of the inner wall. The milk flowing over the corrugated surface of the body 15 collects in a pan at the bottom of the unit and is led off through openings in the pan to a filter receptacle 19. The receptacle 19 is adapted to contain cotton through which the milk is filtered. The milk is then led off through a pipe 20 to the exterior of the body 1, which pipe 20 is provided at its end with a cock 21 disposed over the opening in the milk can 9.

Access to the body 1 may be had through an opening disposed in the front of the tank by opening a door 22 hinged at one of its upright edges to the body 1 adjacent the corresponding side of the opening. The door is provided with glazed ports.

In operation the device performs as follows: Milk fresh from the milking machine or pail is poured into the receptacle or hopper 2, where it finds its way through the double strainer 3, which of course retains all extraneous matter and deposits the preliminarily cleaned milk in the bottom of the receptacle. Flow of the milk from the receptacle 2 is controlled by the valves 4 and 6. The milk falls into a receptacle 16 on the crown of the body 15 and escapes through perforations in the wall of the receptacle 16 onto the sides of the body 15. The temperature of the milk is consequently reduced and by the time it reaches the pan and filter 19 it is thoroughly cooled. Passage of the milk through the cotton in the filter 19 completes the cleaning process and the liquid finally finds its way through pipe 20 and cock 21 to the awaiting milk can 9, in which when the incoming milk reaches a certain level, the float 10 is lifted and with it the control means to shut off valve 7 in the receiving receptacle or hopper 2.

Having now described the nature of my invention and the manner in which the same operates, what I claim and desire to secure by Letters Patent is:

In a milk receiving apparatus of the character described, the combination of an upright casing, a receiving receptacle supported on said casing, a valve in the bottom of the receptacle to control the flow of milk therefrom, a strainer in the head of the receptacle, a cooling unit disposed within the casing and beneath the receptacle, a filter receptacle beneath the cooling unit to receive the milk and direct its flow to an awaiting receptacle, and a float controlled system of levers and rods at the side of the casing connected at one end to the valve in the receiving receptacle and a float suspended at the other.

ANGEL FRANCISCO ORTIZ.